(12) United States Patent
Dibout et al.

(10) Patent No.: US 12,030,340 B2
(45) Date of Patent: Jul. 9, 2024

(54) VEHICLE WHEEL RIM

(71) Applicant: RENAULT s.a.s., Boulogne-Billancourt (FR)

(72) Inventors: Simon Dibout, Massy (FR); Melanie Barriere-Forgeas, Saint Lubin de la Haye (FR); Anthony Reullier, Brette les Pins (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 782 days.

(21) Appl. No.: 16/973,642

(22) PCT Filed: Feb. 26, 2019

(86) PCT No.: PCT/EP2019/054653
§ 371 (c)(1),
(2) Date: Dec. 9, 2020

(87) PCT Pub. No.: WO2019/238278
PCT Pub. Date: Dec. 19, 2019

(65) Prior Publication Data
US 2021/0245547 A1   Aug. 12, 2021

(30) Foreign Application Priority Data
Jun. 12, 2018   (FR) ..................... 18 55101

(51) Int. Cl.
*B60B 21/10*   (2006.01)
*B33Y 80/00*   (2015.01)
*B60B 21/02*   (2006.01)

(52) U.S. Cl.
CPC ............ *B60B 21/102* (2013.01); *B33Y 80/00* (2014.12); *B60B 21/023* (2013.01);
(Continued)

(58) Field of Classification Search
CPC .......... B60B 2310/20; B60B 2360/104; B33Y 80/00
(Continued)

(56) References Cited

U.S. PATENT DOCUMENTS

| | | |
|---|---|---|
| 2012/0291283 A1 | 11/2012 | Ikeda et al. |
| 2017/0341122 A1 | 11/2017 | Di Serio et al. |
| 2017/0349002 A1 | 12/2017 | Di Serio et al. |

FOREIGN PATENT DOCUMENTS

| | | | |
|---|---|---|---|
| DE | 10 2016 005 646 A1 | 12/2016 | |
| DE | 102016005646 A1 * | 12/2016 | ............. B60B 30/00 |

(Continued)

OTHER PUBLICATIONS

International Search Report issued on May 29, 2019 in PCT/EP2019/054653 filed on Feb. 26, 2019, 2 pages.

(Continued)

*Primary Examiner* — S. Joseph Morano
*Assistant Examiner* — Eva L Comino
(74) *Attorney, Agent, or Firm* — Oblon, McClelland, Maier & Neustadt, L.L.P.

(57) ABSTRACT

A vehicle wheel rim is printed with a metal alloy by a three-dimensional printing method. The rim includes a substantially circular rolling strip defined by a front edge and a rear edge. The rolling strip includes a central rim base, a front part including fittings for a front tire support, located between the rim base and the front edge, and a rear part including fittings for a rear tire support, located between the rim base and the rear edge. The rim is designed to be mounted on a vehicle such that the front edge is located on an outer side of the vehicle and the rear edge is located on an inner side of the vehicle. The rolling strip includes a plurality of cavities in the thickness thereof and in a radial section.

8 Claims, 4 Drawing Sheets

(52) U.S. Cl.
CPC .......... *B60B 21/025* (2013.01); *B60B 21/104* (2013.01); *B60B 2310/20* (2013.01); *B60B 2360/104* (2013.01)

(58) Field of Classification Search
USPC ..................................................... 301/95.104
See application file for complete search history.

(56) References Cited

FOREIGN PATENT DOCUMENTS

| | | | | |
|---|---|---|---|---|
| EP | 2 540 521 | A1 | 1/2013 | |
| FR | 2817800 | A1 * | 6/2002 | ............ B60B 21/00 |
| FR | 3 030 370 | A1 | 6/2016 | |
| KR | 1020150063969 | A * | 1/2015 | ............ B60B 21/12 |
| WO | WO-9731792 | A1 * | 9/1997 | ............ B21D 53/30 |
| WO | WO-2005075220 | A1 * | 8/2005 | ........... B60B 21/025 |
| WO | WO 2015/106977 | A1 | 7/2015 | |

OTHER PUBLICATIONS

Preliminary French Search Report issued on Dec. 21, 2018 in French Application No. 1855101 filed on Jun. 12, 2018, 2 pages.

* cited by examiner

VEHICLE WHEEL RIM

BACKGROUND

The invention relates to the field of vehicle wheels, in particular for motor vehicles.

The invention relates to a vehicle wheel rim.

Aluminum rims are generally manufactured by forging or flow forming methods. These are solid components not comprising any cavities.

Aluminum rims are very widespread since they offer a good relationship between quality, reliability and esthetics. They are more lightweight than steel rims.

In order to lighten aluminum rims, it is known practice to use a casting method for producing a cavity in the region of the front hook of the barrel of the rim. This makes it possible to slightly reduce the weight of the rim. However, it would be desirable to further reduce the weight of the rim.

There already exist rims made of composite materials, for example containing kevlar or carbon. The cost of such rims is high. They are indeed more lightweight, but they are fragile, in particular when subjected to longitudinal impacts, for example when mounting a sidewalk, or when subjected to lateral impacts, in particular when rubbing along a sidewalk.

Document DE102016005646 discloses the use of three-dimensional metal printing for manufacturing a rim. This document discloses cavities located in the rim, in particular a plurality of cavities in the spokes of the front face, and also a cavity in the region of the front hook of the barrel. Thus, in relation to a rim produced with a casting method, the weight is lighter at the front face, but not in the barrel.

BRIEF SUMMARY

The invention aims to further lower the weight of a rim printed with a metal alloy by a three-dimensional printing method while ensuring a satisfactory mechanical structure, in particular with regard to axial impact resistance.

The invention is concerned with a rim for a wheel of a vehicle, printed with a metal alloy by a three-dimensional printing method, comprising a substantially circular barrel delimited by a front flange and a rear flange, the barrel comprising:
  a central rim base,
  a front fittings part for front support of a tire, located between the rim base and the front flange,
  a rear fittings part for rear support of a tire, located between the rim base and the rear flange,
the rim being intended to be assembled on a vehicle such that the front flange is located on an outer side of the vehicle and the rear flange is located on an inner side of the vehicle, the barrel comprising, within its thickness and in a radial cross section, a plurality of cavities.

According to one aspect of the invention, the front fittings part comprises a front outer surface intended to come into contact with a tire, and a front inner surface opposite to said front outer surface, the front fittings part comprising a front hook and a front bead seat for a tire, the barrel comprising a front hook cavity located at least in part in the front hook, and a front bead seat cavity located at least in part between the front bead seat and that part of the front inner surface facing said front bead seat, the front hook cavity and the front bead seat cavity being separated by a reinforcing wall.

According to one aspect of the invention, the reinforcing wall has a thickness greater than two millimeters, in a radial cross section of the barrel.

According to one aspect of the invention, the front outer surface of the front fittings part comprises a front safety hump located between the rim base and the front bead seat, the barrel comprising a front hump cavity located between the front hump and the front inner surface of the front fittings part facing said front hump, the front hump cavity and the front bead seat cavity being separated by a consolidating wall, with the result that the reinforcing wall and the consolidating wall form a substantially V-shaped separating partition around the front bead seat cavity, in a radial cross section of the barrel.

According to one aspect of the invention, the separating partition has a thickness greater than two millimeters, in a radial cross section of the barrel.

According to one aspect of the invention, the front hump cavity is split into a first front hump sub-cavity and a second front hump sub-cavity such that the first front hump sub-cavity and the front bead seat cavity are separated from the second front hump sub-cavity by a separating wall, with the result that the separating wall, the reinforcing wall and the consolidating wall form a substantially triangular circumferential partition around the front bead seat cavity, in a radial cross section of the barrel 3.

According to one aspect of the invention, the circumferential partition has a thickness greater than two millimeters, in a radial cross section of the barrel.

According to one aspect of the invention, the volume of the plurality of front cavities occupies between 40% and 80% of the volume of the front fittings part.

According to one aspect of the invention, the front cavities are at a distance of at least two millimeters from the front inner and front outer surfaces of the front fittings part.

According to one aspect of the invention, the rear fittings part comprises a rear hook and a rear bead seat for a tire, the barrel comprising within its thickness at least one rear cavity in the rear fittings part.

According to one aspect of the invention, the rim comprises a rear hook cavity located at least in part in the rear hook.

According to one aspect of the invention, the rear fittings part comprises a rear outer surface intended to come into contact with a tire, and a rear inner surface opposite to said front outer surface, the rear outer surface of the rear fittings part comprising a rear safety hump located between the rim base and the rear bead seat, the barrel comprising a rear hump cavity located between the rear hump and the rear inner surface of the rear fittings part facing said rear hump.

According to one aspect of the invention, the rear cavity or cavities is/are at a distance of at least one millimeter from the rear inner and rear outer surfaces of the front fittings part.

According to one aspect of the invention, at least two cavities are of substantially annular shape and coaxial with an axis of rotation of the barrel.

According to one aspect of the invention, the front hump cavity is of substantially annular shape and coaxial with the axis of rotation of the barrel.

According to one aspect of the invention, the rear hump cavity is of substantially annular shape and coaxial with the axis of rotation of the barrel.

According to one aspect of the invention, the front hook cavity is of substantially annular shape and coaxial with the axis of rotation of the barrel.

According to one aspect of the invention, the rear hook cavity is of substantially annular shape and coaxial with the axis of rotation of the barrel.

According to one aspect of the invention, the first front hump sub-cavity is of substantially annular shape and coaxial with the axis of rotation of the barrel.

According to one aspect of the invention, the second front hump sub-cavity is of substantially annular shape and coaxial with the axis of rotation of the barrel.

According to one aspect of the invention, the front bead seat cavity is of substantially annular shape and coaxial with the axis of rotation of the barrel.

According to one aspect of the invention, the consolidating wall is of substantially annular shape and coaxial with the axis of rotation of the barrel.

BRIEF DESCRIPTION OF THE DRAWINGS

Other advantages and features of the invention will become apparent on reading the description and the drawings, which are.

DETAILED DESCRIPTION

Figure 1:
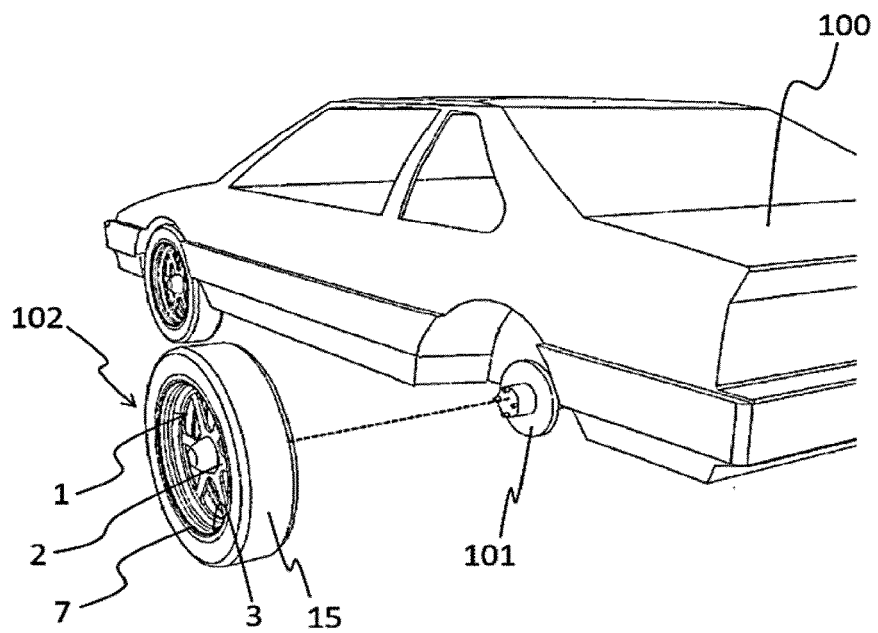
FIG. 1, which represents a perspective view of the outer side of a vehicle, one of the wheels of the vehicle being disassembled from its axle, FIG. 2, which represents a perspective view of a wheel disassembled from its axle, viewed from the inner side of the vehicle, FIG. 3, which represents a radial cross section of a rim, FIG. 4, which represents a radial cross section of the front fittings part of the rim according to a first embodiment, FIG. 5, which represents a radial cross section of the front fittings part of the rim according to a second embodiment, FIG. 6, which represents a radial cross section of the front fittings part of the rim according to a third embodiment, FIG. 7, which represents a radial cross section of the rear fittings part of the rim according to any one of the embodiments.

FIG. 1 illustrates a vehicle 100 in which the left rear wheel 102 has been disassembled from the vehicle 100. This makes it possible to see the axle 101 on which the wheel 102 is intended to be mounted.

The wheel 102 comprises a rim 1 and a tire 15.

The rim 1 comprises a front face 2 and a substantially circular barrel 3 delimited on the outer side of the vehicle by a front flange 7.

The barrel 3 is the circular peripheral strip of the rim 1 that is intended to receive the tire 102 of the vehicle 100.

The front flange 7 is substantially circular.

The front face 2 of the rim 1 is perpendicular to the barrel 3 which, when the rim 1 is mounted on a vehicle, is visible from the outside of the vehicle in a side view of the vehicle. The front face 2 comprises spokes.

Figure 2:
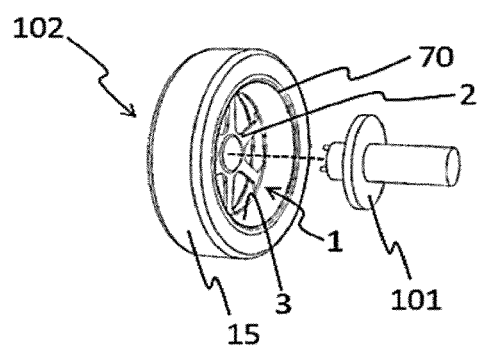

As illustrated in FIG. 2, the barrel 3 of the rim 1 is delimited on the inner side of the vehicle by a rear flange 70. The rear flange 70 of the rim 1 is the flange of the rim 1 that is intended to face the axle 101 of the vehicle.

The rear flange 70 is substantially circular.

The rim 1 of the invention is printed with a metal alloy by a three-dimensional printing method, known for example from the prior art.

According to a preferred embodiment, the rim 1 is printed with an aluminum alloy.

Figure 3:
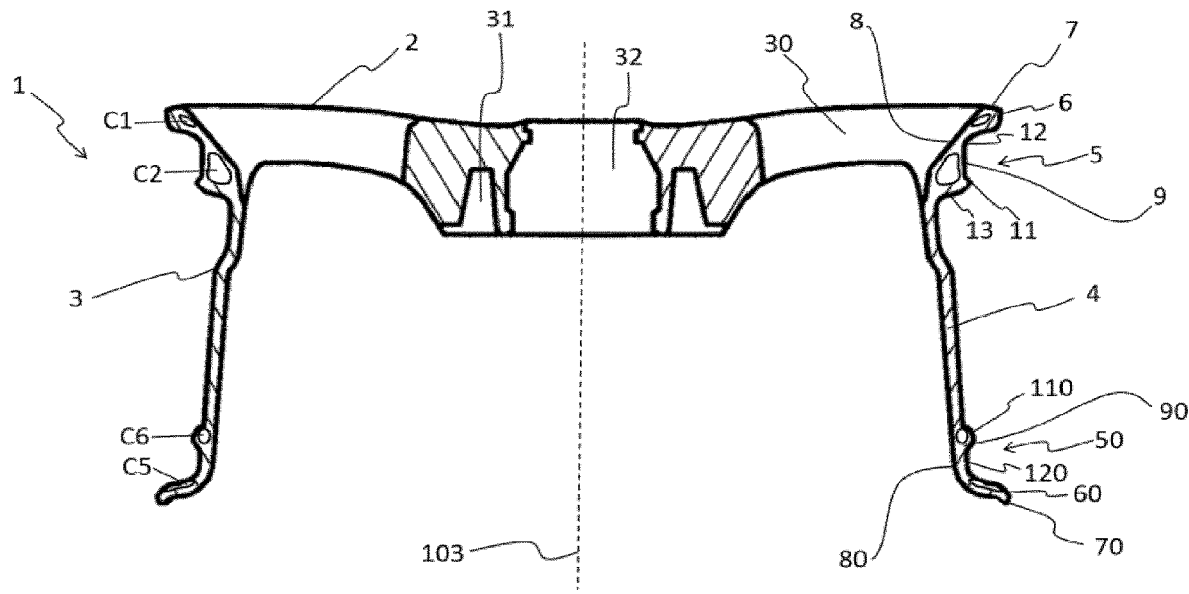

As illustrated in FIG. 3, the front face 2 comprises spokes 30, bolt holes 31 and a hub hole 32. The axis of rotation 103 of the barrel 3 passes through the center of the hub hole 32.

With the barrel 3 being substantially circular, a cross section of the barrel 3 in a plane perpendicular to the axis of rotation 103 is a substantially circular ring.

FIG. 3 is a radial cross section of the rim 1, that is to say a view in a plane perpendicular to the general plane of the front face 2.

The barrel 3 is a circular peripheral strip. The parts of the rim 1 that are not circular do not form part of the barrel, but belong to the front face 2.

The barrel 3 comprises, in its central part, a rim base 4.

The barrel 3 comprises at its ends, on either side of the rim base 4, fittings parts 5, 50 for supporting a tire.

The front fittings part 5 for front support of a tire 15 is located between the rim base 4 and the front flange 7.

The front fittings part 5 is located on the front face 2 side.

The rear fittings part 50 for rear support of a tire 15 is located between the rim base 4 and the rear flange 70.

The surface of the front fittings part 5 that is intended to come into contact with the tire 15 is the front outer surface 9. The surface of the front fittings part 5 that is opposite to and faces the front outer surface 9 is the front inner surface 8.

The inner surface 8 delimits the front face 2 from the front fittings part 5 of the barrel 3. The inner surface 8 is circular. Thus, a cross section of the barrel 3 in any plane parallel to the axis of rotation 103 of the rim 1 is a substantially circular ring. The end part of the spokes 30 that is connected to the barrel 3 does not form part of the front fittings part 5, even if the spokes 30 are formed in one piece with the barrel 3.

The front fittings part 5 comprises a front hook 6, a front bead seat 12 for a tire 102 and a front safety hump 11. The front safety hump 11 is located on the front outer surface 9. The front bead seat 12 is intended to receive the front bead of a tire 102, said front bead being retained on either side by the front hook 6 and the front safety hump 11.

The front outer surface 9 comprises a drop part 13 which connects the front safety hump 11 to the rim base 4. In other words, in the front fittings part 5, the general plane of the front bead seat 12 is not in the same plane as the rim base 4, the distance separating them being greater than a value of the order of one centimeter, for example around two centimeters.

On the opposite side to the front face 2, that is to say on the rear flange 70 side, the barrel 3 comprises a rear fittings part 50 comprising a rear hook 60, a rear bead seat 120 for a tire 15 and a rear safety hump 110.

The surface of the rear fittings part 50 that is intended to come into contact with the tire 15 is the rear outer surface 90. The surface of the rear fittings part 50 that is opposite to and faces the rear outer surface 90 is the rear inner surface 80.

The rear safety hump 110 is located on the rear outer surface 90.

The rear bead seat 120 is intended to receive the rear bead of a tire 15, said rear bead being maintained on either side by the rear hook 60 and the rear safety hump 110.

The rim base 4 is situated between the front safety hump 11 and the rear safety hump 110.

The rim base 4 does not comprise the drop part 13 which connects the front safety hump 11 to the rim base 4. The drop part 13 belongs to the front fittings part 5.

In order to lighten the weight of the rim 1, front cavities C1, C2 are present in the front fittings part 5, and rear cavities C5, C6 are present in the rear fittings part 50.

The cavities, in particular the front cavities C1, C2, cannot be arranged in an arbitrary manner within the barrel 3.

The arrangement of the front cavities C1, C2 must make it possible to comply with the standards imposed by the automotive sector while lightening as far as possible the weight of the barrel 3.

In particular, standard ISO 7141:2005 prescribes a laboratory test method intended to evaluate the resistance to axial impact, that is to say lateral impact against the sidewalk, of wheels manufactured entirely or partially from light alloy. It is applicable to wheels for private cars and for other vehicles in which the wheel may be in contact with the sidewalk, with the aim of quality control and classification. A poor arrangement of the front cavities C1, C3 may cause cracking or fracturing of the rim. The embodiments described above allow significant lightening of the weight of the barrel 2 while ensuring good resistance to axial impact as specified in the standard specified above.

Figure 4:
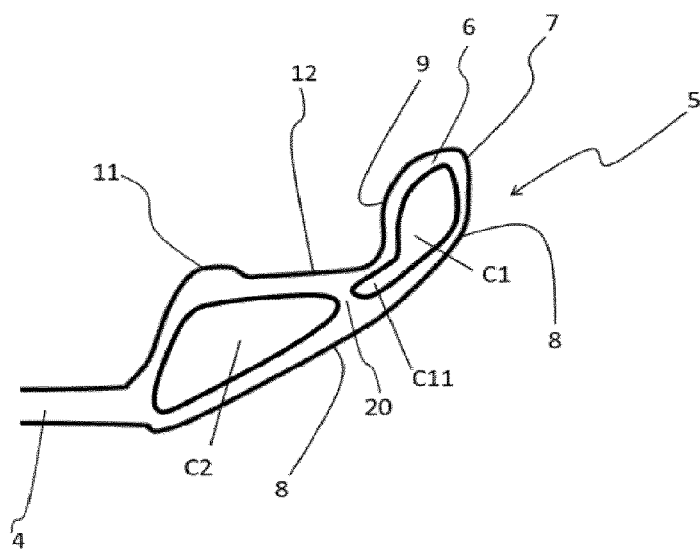

FIG. 4 illustrates a first embodiment according to the invention.

The front fittings part 5 comprises a front hook cavity C1 located at least in part in the front hook 6, a front bead seat cavity C2 located at least in part between the front bead seat 12 and the part of the front inner surface 8 facing it, the front hook cavity C1 and the front bead seat cavity C2 being separated by a reinforcing wall 20.

In a radial cross section of the barrel 3, the reinforcing wall 20 has a thickness greater than two millimeters.

Preferably, in a radial cross section of the barrel 3, the reinforcing wall 20 has a thickness greater than or equal to three and a half millimeters, typically of the order of four millimeters.

Advantageously, the reinforcing wall 20 is located below the front bead seat 12, that is to say between the front bead seat 12 and the part of the front inner face 8 facing it.

Advantageously still, the front hook cavity C1 comprises a lobe C11 located below the front bead seat 12. This makes it possible to optimize the weight saving.

The front bead seat cavity C2 extends below the front bead seat 12 but also below the front hump 11, that is to say between the front hump 11 and the front inner surface 8 of the front fittings part 5 facing it.

Figure 5:
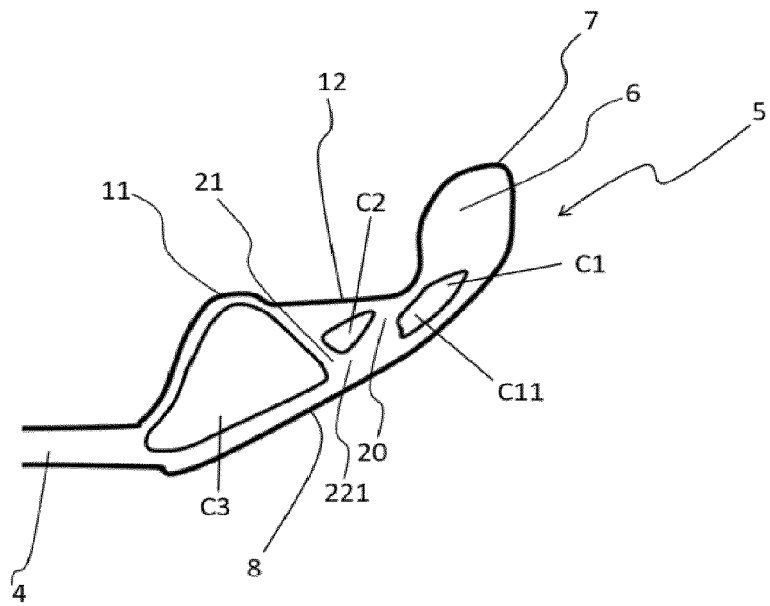

FIG. 5 illustrates a second embodiment according to the invention.

The second embodiment differs from the first embodiment in that the front bead seat cavity C2 is smaller and that the front fittings part 5 comprises a third cavity.

The smaller front bead seat cavity C2 is entirely located below the front bead seat 12. It does not extend below the front hump 11.

The front fittings part 5 comprises a third cavity: the front hump cavity C3.

The front hump cavity C3 is located below the front hump 11, that is to say between the front hump 11 and the front inner surface 8 of the front fittings part 5 facing said front hump 11.

Advantageously, the front hump cavity C3 extends below the front bead seat 12, giving it a substantially triangular shape, in a radial cross section of the barrel 3.

The front hump cavity C3 and the front bead seat cavity C2 are separated by a consolidating wall 21.

In order to ensure good axial impact resistance, the front hump cavity C3 and the front bead seat cavity C2 are arranged in such a way that the reinforcing wall 20 and the consolidating wall 21 form a substantially V-shaped separating partition 221 around the front bead seat cavity C2, in a radial cross section of the barrel 3.

What is to be understood by "V-shaped" is a shape comprising at least two substantially straight portions which face one another and are not parallel to one another and intersect or are joined to one another by way of a planar or rounded portion. The V shape encompasses the flared U shape, for example.

The separating partition 221 acts like a reinforcing rib within the front fittings part 5.

The angle of the V that is formed by the reinforcing wall 20 and the consolidating wall 21 around the front bead seat cavity C2 is, for example, between 45° and 80°.

Advantageously, the front bead seat cavity C2 has the same V shape along the separating partition 221.

Figure 6:
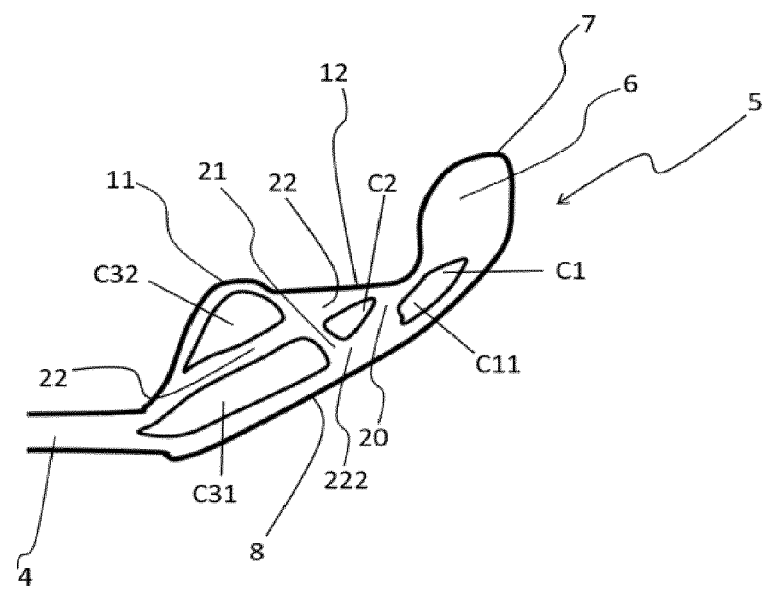

FIG. 6 illustrates a third embodiment according to the invention.

The third embodiment differs from the second embodiment in that the front hump cavity C3 is split into two sub-cavities.

The front hump cavity C3 is split into a first front hump sub-cavity C31 and a second front hump sub-cavity C32 such that the first front hump sub-cavity C31 and the front bead seat cavity C2 are separated from the second front hump sub-cavity C32 by a separating wall 22, with the result that the separating wall 22, the reinforcing wall 20 and the consolidating wall 21 form a substantially triangular circumferential partition 222 around the front bead seat cavity C2, in a radial cross section of the barrel 3.

The advantage of this third embodiment is that of further still reinforcing the axial impact resistance.

Advantageously, in a radial cross section of the barrel 3, the separating wall 22 is substantially parallel to the front inner surface 8.

The substantially triangular circumferential partition 222 acts like a tri-directional reinforcing rib below the front bead seat C2, which is a location of the front fittings part 5 that is highly stressed during an axial impact. The circumferential partition 222 thus makes it possible to reinforce the front fittings part 5 while lightening it.

The portion of the separating wall 22 located between the first front hump sub-cavity C31 and the second front hump sub-cavity C32 has a thickness greater than two millimeters, in a radial cross section of the barrel 3.

Preferably, the portion of the separating wall 22 located between the first front hump sub-cavity C31 and the second front hump sub-cavity C32 has a thickness greater than or equal to three and a half millimeters, typically of the order of four millimeters, in a radial cross section of the barrel 3.

In a radial cross section of the barrel 3, the circumferential partition 222 has a thickness greater than two millimeters.

Preferably, the circumferential partition 222 has a thickness greater than or equal to three and a half millimeters, typically of the order of four millimeters, in a radial cross section of the barrel 3.

The angle between the separating wall 22 and the consolidating wall 21 around the front bead seat cavity C2 is, for example, between 60° and 90°.

Advantageously, the front bead seat cavity C2 has a triangular shape, in a radial cross section of the barrel 3.

Advantageously, the front hump sub-cavity C31 extends below the front bead seat 12, providing it, in a radial cross section of the barrel 3, with a longitudinal shape with respect to the front inner surface 8. Thus, in a radial cross section of the barrel 3, the long edges of the front hump sub-cavity C31 are substantially parallel to the front inner surface 8.

The front hump sub-cavity C32 preferably tightly follows the contours of the hump, providing it with a substantially triangular shape, in a radial cross section of the barrel 3.

In all the embodiments, the front hook cavity C1 can take up a greater or lesser volume within the front hook 6. For example, in FIG. 2, the front hook cavity C1 extends substantially in all the front hook 6. In FIGS. 3 and 4, the front hook cavity C1 extends substantially in a quarter of the front hook 6. These examples are not limiting. The front hook cavity C1 of FIG. 4 can be implemented in the second and third embodiments. Likewise, the front hook cavity C1 of FIGS. 5 and 6 can be implemented in the first embodiment.

Figure 7:
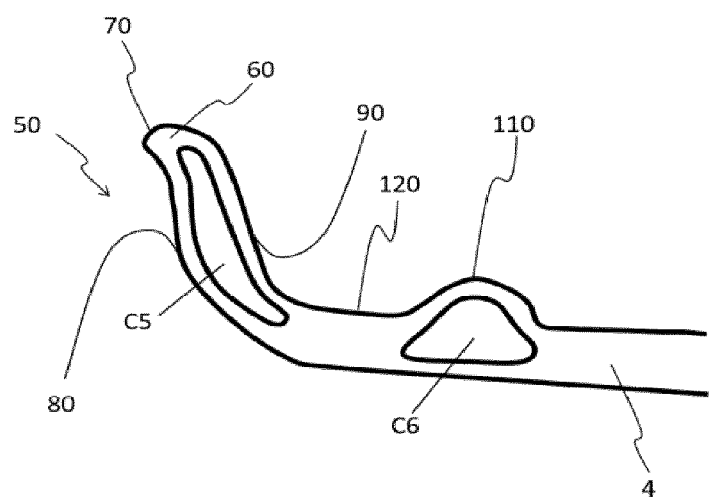

In order to lighten further the barrel 8 of the rim 1, and as illustrated in FIG. 7, the rear fittings part 50 advantageously comprises within its thickness at least one rear cavity C5, C6. This is applicable in all the above-described embodiments.

Thus, the rear hook 60 comprises within it a rear hook cavity C5.

A rear hump cavity C6 is located between the rear hump 110 and the rear inner surface 80 of the rear fittings part 50 facing said rear hump 110.

Advantageously, the front cavities C1, C2, C3, C31, C32 are at a distance of at least two millimeters from the front inner surface 8 and front outer surface 9 of the front fittings part 5.

Advantageously, the rear cavities C5, C6 are at a distance of at least one millimeter from the rear inner surface 80 and rear outer surface 90 of the rear fittings part 50.

Advantageously, the rear cavities C5, C6 are closer to the rear inner surface 80 and rear outer surface 90 of the rear fittings part 50 than are the front cavities C1, C2, C3, C31, C32 to the front inner surface 8 and front outer surface 9 of the front fittings part 5.

The barrel 3 is manufactured from a metal alloy, for example maraging steel, or an alloy comprising one or more metals such as titanium, aluminum and magnesium.

Preferably, the barrel 3 is manufactured from an aluminum alloy.

Preferably, the barrel 3 and the front face 2 are manufactured in one piece, with the same method, from the same material.

Alternatively, the front face 2 of the rim 1 can be manufactured from a different material from the barrel 3 and assembled thereto by any known method, such as for example welding, brazing, clipping, adhesive bonding, screwing or force-fitting.

The front cavities C1, C2, C3, C31, C32 and the rear cavities C5, C6 are preferably closed, that is to say that they define closed spaces.

However, it is possible for the front cavities C1, C2, C3, C31, C32 and/or the rear cavities C5, C6 to have at least one opening or a plurality of openings, if that does not weaken the structure.

The front cavities C1, C2, C3, C31, C32 and the rear cavities C5, C6 are internal, that is to say that they are located within the thickness of the barrel and are not visible respectively on the front inner surface 8 and front outer surface 9 of the front fittings part 5 and on the rear inner surface 80 and rear outer surface 90 of the rear fittings part 50.

Preferably, the front cavities C1, C2, C3, C31, C32 and the rear cavities C5, C6 are of substantially annular shape and coaxial with the axis of rotation 103 of the barrel 3.

An annular shape is a closed circular shape of any cross section. For example, a cavity of substantially triangular or elongate cross section and present on all the radial cross sections of the barrel 3 is annular.

The invention claimed is:

1. A rim for a wheel of a vehicle, printed with a metal alloy by a three-dimensional printing method, the rim comprising:
   a substantially circular barrel delimited by a front flange and a rear flange, the barrel comprising:
   a central rim base,
   a front fittings part for front support of a tire, located between the rim base and the front flange, and
   a rear fittings part for rear support of a tire, located between the rim base and the rear flange,
   wherein the rim is configured to be assembled on a vehicle such that the front flange is located on an outer side of the vehicle and the rear flange is located on an inner side of the vehicle,
   wherein the barrel comprises, within its thickness and in a radial cross section, a plurality of cavities,
   wherein the front fittings part comprises a front outer surface configured to come into contact with a tire, and a front inner surface opposite to said front outer surface, the front fittings part comprising a front hook and a front bead seat for the tire, the barrel comprising a front hook cavity located at least in part in the front hook, and a front bead seat cavity located at least in part between the front bead seat and the part of the front inner surface facing it, the front hook cavity and the front bead seat cavity being separated by a reinforcing wall, and
   wherein the front outer surface of the front fittings part comprises a front safety hump located between the rim base and the front bead seat, the barrel comprising a front hump cavity located between the front hump and the front inner surface of the front fittings part facing said front hump, the front hump cavity and the front bead seat cavity being separated by a consolidating wall, such that the reinforcing wall and the consolidating wall form a substantially V-shaped separating partition around the front bead seat cavity, in a radial cross section of the barrel.

2. The rim as claimed in claim 1, wherein the separating partition has a thickness greater than two millimeters, in a radial cross section of the barrel.

3. The rim as claimed in claim 1, wherein the front hump cavity is split into a first front hump sub-cavity and a second front hump sub-cavity such that the first front hump sub-cavity and the front bead seat cavity are separated from the second front hump sub-cavity by a separating wall, such that the separating wall, the reinforcing wall, and the consolidating wall form a substantially triangular circumferential partition around the front bead seat cavity, in a radial cross section of the barrel.

4. The rim as claimed in claim 1, wherein the front fittings part comprises a plurality of front cavities, the volume of the plurality of front cavities occupying between 40% and 80% of the volume of the front fittings part.

5. The rim as claimed in claim 1, wherein the rear fittings part comprises a rear hook and a rear bead seat for a tire, the barrel comprising within its thickness at least one rear cavity in the rear fittings part.

6. The rim as claimed in claim 5, further comprising a rear hook cavity located at least in part in the rear hook.

7. The rim as claimed in claim 5, wherein the rear fittings part comprises a rear outer surface configured to come into contact with a tire, and a rear inner surface opposite to said front outer surface, the rear outer surface of the rear fittings part comprising a rear safety hump located between the rim base and the rear bead seat, the barrel comprising a rear hump cavity located between the rear hump and the rear inner surface of the rear fittings part facing said rear hump.

8. The rim as claimed in claim 1, wherein at least two of the cavities are of substantially annular shape and coaxial with an axis of rotation of the barrel.

* * * * *